(12) United States Patent
Chen et al.

(10) Patent No.: US 10,345,192 B2
(45) Date of Patent: Jul. 9, 2019

(54) SINGLE-END OPTICAL FIBER TRANSFER MATRIX MEASUREMENT USING SPATIAL PILOT

(71) Applicant: ALCATEL-LUCENT USA INC., Murray Hill, NJ (US)

(72) Inventors: Haoshuo Chen, Holmdel, NJ (US); Nicolas K. Fontaine, Holmdel, NJ (US); Peter Winzer, Holmdel, NJ (US); Roland Ryf, Holmdel, NJ (US); David Neilson, Holmdel, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/791,843

(22) Filed: Oct. 24, 2017

(65) Prior Publication Data

US 2018/0266917 A1    Sep. 20, 2018

Related U.S. Application Data

(60) Provisional application No. 62/471,239, filed on Mar. 14, 2017.

(51) Int. Cl.
| | | |
|---|---|---|
| G01M 11/00 | (2006.01) | |
| H04J 14/04 | (2006.01) | |
| H04B 10/071 | (2013.01) | |
| H04B 10/073 | (2013.01) | |

(52) U.S. Cl.
CPC .... *G01M 11/3109* (2013.01); *G01M 11/3118* (2013.01); *G01M 11/3127* (2013.01); *G01M 11/3136* (2013.01); *G01M 11/3145* (2013.01); *G01M 11/3181* (2013.01);
(Continued)

(58) Field of Classification Search
None
See application file for complete search history.

(56) References Cited

U.S. PATENT DOCUMENTS

2013/0195455 A1* 8/2013 Jansen ................ H04B 10/506
                                                         398/65
2014/0105604 A1* 4/2014 Luo ....................... H04L 25/085
                                                         398/98
(Continued)

OTHER PUBLICATIONS

Carpenter, Joel, Benjamin J. Eggleton, and Jochen Schröder. "110x33 110 optical mode transfer matrix inversion." Optics express 22.1 (2014): 96-101. (Year: 2014).*

(Continued)

*Primary Examiner* — Shawn Decenzo
(74) *Attorney, Agent, or Firm* — Kramer Amado, P.C.

(57) ABSTRACT

Various embodiments relate to a method including: coupling one or more optical spatial pilot signals into a first end of optical fiber, wherein the optical fiber is a multimode optical fiber; Reflecting and modifying each mode of the optical pilot signals at a second end of the optical fiber; receiving a reflected portion of the one or more optical spatial pilot signals at the first end of the of the optical fiber in response to the reflected portion having propagated through the optical fiber in both directions; processing the reflected spatial pilot to determine components of one of a round-trip transfer matrix of the optical fiber and a single-direction transfer matrix of the optical fiber.

15 Claims, 4 Drawing Sheets

(52) U.S. Cl.
CPC ....... *H04B 10/071* (2013.01); *H04B 10/0731* (2013.01); *H04J 14/04* (2013.01)

(56) References Cited

U.S. PATENT DOCUMENTS

| | | | | |
|---|---|---|---|---|
| 2014/0286648 | A1* | 9/2014 | Buelow | G02B 6/2808 398/143 |
| 2015/0139648 | A1* | 5/2015 | Striegler | H04L 12/12 398/65 |
| 2015/0244418 | A1* | 8/2015 | Verbin | H04B 3/32 370/201 |
| 2017/0214466 | A1* | 7/2017 | Alfano | H04J 14/04 |
| 2017/0264367 | A1* | 9/2017 | Awwad | H04B 10/2581 |
| 2017/0299900 | A1* | 10/2017 | Montoya | G02F 1/0115 |
| 2018/0202895 | A1* | 7/2018 | Hayashi | G02B 6/02042 |
| 2018/0259370 | A1* | 9/2018 | Fontaine | G01D 5/3539 |

OTHER PUBLICATIONS

Chen, Haoshuo, Nicolas K. Fontaine, and Roland Ryf. "Transfer matrix characterization of 10-mode mode-selective spatial multiplexers." Photonics Society Summer Topical Meeting Series (SUM), 2016 IEEE. IEEE, 2016. (Year: 2016).*

Fontaine, Nicolas K., et al. "Characterization of space-division multiplexing systems using a swept-wavelength interferometer." Optical Fiber Communication Conference and Exposition and the National Fiber Optic Engineers Conference (OFC/NFOEC), 2013. IEEE, 2013. (Year: 2013).*

Chen, et al., "Compact spatial multiplexers for mode division multiplexing", Opt. Express, 22, 1094-4087, 2014.

Fontaine, et al., "Characterization of Space-Division Multiplexing Systems using a Swept-Wavelength . . . ,", OFC 2013, p. OW1K.2.

Ford, et al., "Characterization of optical fiber imaging bundles for swept-source . . . ", Applied Optics, 50, 627-640, 2011.

Hayashi, et al., "125-μm-cladding Coupled Multi-core Fiber with Ultra-low Loss of 0.158 dB/km . . . ", OFC 2016, p. Th5A.1.

Ramirez et al., "Coherent beam combining with an ultrafast multicore Yb-doped fiber amplifier", Opt. Express, 23, 5406-5416, 2015.

Ploschner, et al., "Seeing through chaos in multimode fibres", Nature Photonics 9, 9, 2015.

R. Gu, et al., "Design of flexible multi-mode fiber endoscope,", Opt. Express, 23, 243992-243992, 2015.

Ryf, et al., "10-Mode Mode-Multiplexed Transmission with Inline Amplification", ECOC 2016, p. 1-3.

RYF, et al., "Combined SDM and WDM transmission over 700-km Few-Mode Fiber", Optical Society of America, Technical Digest, 3 pages. (2013).

* cited by examiner

SINGLE-END OPTICAL FIBER TRANSFER MATRIX MEASUREMENT USING SPATIAL PILOT

RELATED APPLICATION

This application claims the benefit of U.S. Provisional Application No. 62/471,239 filed Mar. 14, 2017, which is hereby incorporated by reference for all purposes as if fully set forth herein.

TECHNICAL FIELD

Various embodiments disclosed herein relate generally to measuring a transfer matrix at a single-end of an optical fiber using a spatial pilot.

BACKGROUND

Space-division multiplexing (SDM) employs optical propagation modes with different lateral intensity and/or phase profiles in a multimode optical fiber (MMF) or multicore optical fiber (MCF). SDM has been used to increase the total optical fiber transmission capacity and may help to avert a future data capacity crunch. MMF and MCF have been successfully applied to short-reach links, and access networks. Summary of Some Exemplary Embodiments

SUMMARY

A brief summary of various embodiments is presented below. Some simplifications and omissions may be made in the following summary, which is intended to highlight and introduce some aspects of the various exemplary embodiments, but not to limit the scope of the invention. Detailed descriptions of at least one embodiment adequate to allow those of ordinary skill in the art to make and use the inventive concepts will follow in later sections.

Various embodiments described herein relate to a method including: coupling one or more optical spatial pilot signals into a first end of optical fiber, wherein the optical fiber is a multimode optical fiber; Reflecting and modifying each mode of the optical pilot signals at a second end of the optical fiber; receiving a reflected portion of the one or more optical spatial pilot signals at the first end of the of the optical fiber in response to the reflected portion having propagated through the optical fiber in both directions; processing the reflected spatial pilot to determine components of one of a round-trip transfer matrix of the optical fiber and a single-direction transfer matrix of the optical fiber.

Further various embodiments described herein relate to a n apparatus including: an optical transmitter configured to generate one or more components of an optical spatial pilot; a multimode optical coupler configured to couple the components of the optical spatial pilot onto different propagation modes of an optical fiber at a first end thereof; and an optical analyzer configured to process light emitted at the first end in response to the components of the optical spatial pilot being coupled to the optical fiber at the first end to determine components of a round-trip and/or a single-direction mode transfer matrix of the optical fiber.

BRIEF DESCRIPTION OF THE DRAWINGS

In order to better understand various example embodiments, reference is made to the accompanying drawings, wherein.

DETAILED DESCRIPTION

Figure 1A:
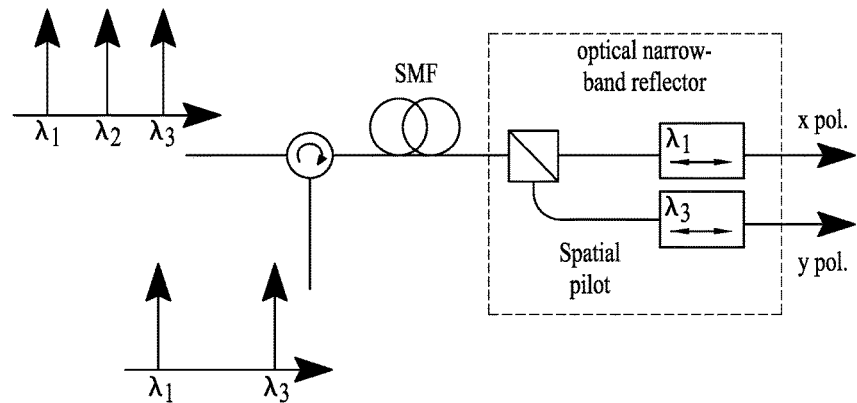
FIG. 1A illustrates the use of a wavelength optical based spatial pilot using a single mode fiber and two polarizations.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Besides telecommunication, MMF and MCF are also promising for other applications such as: optical fiber endoscopes, which may provide high resolution images in a small footprint; high power lasers, which coherently combine the output fields from multiple cores to avoid optical fiber nonlinearities and material damage; scanner-free optical coherence tomography through beam forming, which eliminates scanning components; etc.

When MMF and MCF are used in various applications, propagation mode coupling may occur, i.e., one propagating mode may be partially or completely converting into one or more other propagating modes of the optical fiber during propagation in the optical fiber. For example, such propagation mode coupling may occur between different spatial propagation modes, i.e., propagation modes having different lateral intensity and/or phase profile. Typically, in order to characterize such mode coupling in an optical fiber, both input and output facets of the optical fiber are accessed in order to measure the transfer matrix of the optical fiber in the calibration stage in both directions on the optical fiber. Indeed, the mode coupling is not necessarily the same for propagation in both directions in an optical fiber. This type of measurement requires a transmitter, receiver, and signal processor at each end of the optical fiber. The time-consuming and cumbersome calibration may need to be redone if the optical fiber gets disturbed in most non-telecom applications. For SDM transmission, multiple-input-multiple-out (MIMO)-based digital signal processing may be used to compensate for the mode coupling over the optical fiber in order to correctly recover the data transmitted, e.g., based on the measurement of such a transfer matrix of an optical fiber link.

The embodiments disclosed herein provide spatial pilot solutions to enable single-end, optical fiber, transfer matrix measurements. The embodiments may apply spatial pilots varying in time and/or frequency to differentiate various spatial and/or polarization propagation modes at the remote optical fiber end. Some of these embodiments allow for measurement of the mode transfer matrix for both propagation directions in an optical fiber based on measurements made at a single end of the optical fiber.

A straightforward way to realize spatial pilots is to attach a compact spatial multiplexer, which separates different spatial and/or polarization modes into multiple single-mode fibers at the remote/distal end, and employ different time delays, which can be realized by optical fiber delay lines or frequency filtering (assuming that here are multiple wavelengths present in the signal), which can be realized by optical bandpass filters, to the outputs of the single-mode fibers before reflecting all the modes.

For an optical fiber having 2M spatial and polarization orthogonal propagating modes, the mode transfer matrix H is a 2M×2M square matrix (i.e., two polarizations for each spatial propagation mode). The mode transfer matrix H may be nearly unitary and may have a negligible mode-dependent loss (MDL), e.g., for a short fiber link operating is a low loss wavelength range such as the optical fiber communication C-band. The mode transfer matrix for backward propagation is $H^T$, where T is the transpose operator if the transmission characteristics are the same in both propagation directions in the optical fiber (which can be guaranteed as the optical fiber is stable during the measurement. For deployed fibers, they can usually be regarded stable for a short period of time, such as 50 micro-seconds, which is enough for accomplishing the measurement). Thus, the double-pass mode transform matrix becomes $H^T H$ for perfect reflection and diagonal mode coupling at the far end of the optical fiber by simple reflection all the spatial and polarization modes together.

Here, a single mode optical fiber (SMF) is used as a simplified, but representative example with strong coupling, such that $$H = \begin{pmatrix} a & b \\ c & d \end{pmatrix},$$

where a and d are the coupling coefficiencies for x-to-x and y-to-y polarization, respectively, and b and c are the cross coupling terms, i.e., couplings of x and y polarizations. With perfect and diagonal reflection at the far end of the optical fiber, the double-pass mode transform matrix through reflecting two polarizations with a same reflector may be written as $$H^T H = \begin{pmatrix} a^2 + c^2 & ab + cd \\ ab + cd & b^2 + d^2 \end{pmatrix}.$$

Based upon this formulation, it may be difficult to reconstruct H. But, spatial pilots may be used to measure the mode transform matrix, where the spatial pilots separate spatial and polarization modes and provide different features to different modes at the reflection facet to enable single-ended measurements of the optical fiber's mode transfer matrix as discussed in more detail below.

The spatial pilot may be varied in time and frequency. When using a temporally modulated spatial pilot, the signal may be modified using the following transform:

$$H_{P_t} = \begin{pmatrix} 1 & 0 \\ 0 & e^{j2\pi f t_0} \end{pmatrix},$$

where $t_0$ is the time delay between spatial pilots of two polarizations. In the case with more modes, the size of $H_{P_t}$ will be the same size as H and the diagonal of $H_{P_t}$ will have additional terms $e^{j2\pi f t_n}$ where $t_n$ are additional time delays that lead to the different modes being separated in time. Likewise, when using a frequency based spatial pilot, the signal may be defined by $$H_\lambda = \begin{pmatrix} F_{\lambda 1} & 0 \\ 0 & F_{\lambda 3} \end{pmatrix}$$

where and $F_{\lambda 1}$ and $F_{\lambda 3}$ represent optical wavelengths close to the carrier wavelength. In the case with more modes, the size of $H_{P_\lambda}$ will be the same size as H and the diagonal $H_{P_\lambda}$ will have additional wavelength terms that represent additional offset wavelengths from the carrier that lead to the different modes being separated in wavelength.

FIG. 1A illustrates the use of a wavelength optical based spatial pilot using a single mode fiber and two polarizations. The input signal has a carrier signal with a wavelength of $\lambda_2$ and two other signals with wavelengths $\lambda_1$ and $\lambda_3$. The signal is input to a single mode fiber. The reflector implements the spatial pilot. The reflector separates the signal received from the SMF and splits into two signals based upon polarization. The two signals are then filtered using bandpass filters centered at the wavelengths $\lambda_1$ and $\lambda_3$. The filtered signals may then be combined and reflected back along the SMF and the resulting output is a signal with the two wavelength $\lambda_1$ and $\lambda_3$. After reflections through the optical narrow-band reflectors and filters, matrix $$\begin{pmatrix} a^2 & ab \\ ab & b^2 \end{pmatrix}$$

can be determined by processing the signal at wavelength $\lambda_1$ and matrix $$\begin{pmatrix} c^2 & cb \\ cb & d^2 \end{pmatrix}$$

can be determined by processing the signal at wavelength $\lambda_3$. In similar manner time delays may be used instead of different wavelengths to determine the matrices.

If the mode transfer matrix H is frequency dependent, then the time based spatial pilot may be used. Alternatively, if the length of the time delays needed to measure the H matrix becomes too long, then the frequency based spatial pilot may be used.

For an optical fiber with a small modal dispersion, the mode transfer matrix varies very slowly across the frequency spectrum. Using spatial pilots in time domain, i.e., by processing the received signal in different time windows based upon the time delays, two time-delayed signals may be received and processed.

Figure 1B:
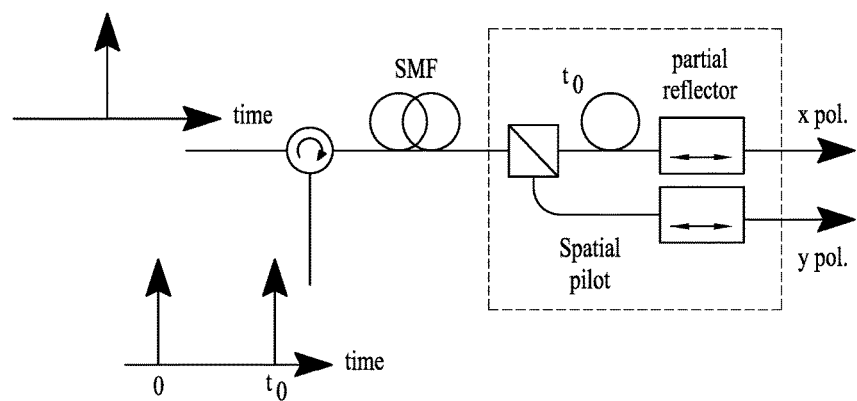
FIG. 1B illustrates the use of a time-delay optical based spatial pilot using a single mode fiber and two polarizations.

FIG. 1B illustrates the use of a time-delay optical based spatial pilot using a single mode fiber and two polarizations. The input signal is input to a single mode fiber. The reflector implements the spatial pilot. The reflector separates the signal received from the SMF and splits into two signals based upon polarization. The one of the two signals is then delayed. The two signals may then be combined and reflected back along the SMF, and the resulting output is a signal with the two signals delayed from one another. After reflections through the optical narrow-band reflectors and filters, matrix $$\begin{pmatrix} a^2 & ab \\ ab & b^2 \end{pmatrix}$$

can be determined by processing the signal at a first time window and matrix $$\begin{pmatrix} c^2 & cd \\ cd & d^2 \end{pmatrix}$$

can be determined by processing the signal at a second time window. This can be seen by calculating $$H^T H_{P_t} H = \begin{pmatrix} a^2 & ab \\ ab & b^2 \end{pmatrix} + e^{j2\pi f t_0} \begin{pmatrix} c^2 & cd \\ cd & d^2 \end{pmatrix}$$

where the time delay separates out different values to be evaluated.

For either type of pilot, the values of a, b, c, and d may be calculated using square root operations on the received diagonal elements of two matrices: $a^2$, $b^2$ in the first matrix and $c^2$, $d^2$ in the second matrix. The elements ab and cd may be applied to correct the $\pi$ phase ambiguity between a, b and c, d after the square root operation. As a result, the values for a, b, c, and d may be calculated and hence the transfer matrix H determined.

Further, these measurements may be expanded to a larger number of modes by adding different time delays to different spatial and polarization modes after mode separation (through a spatial multiplexer) as spatial pilots or by using additional wavelengths instead of delays.

Figure 2:
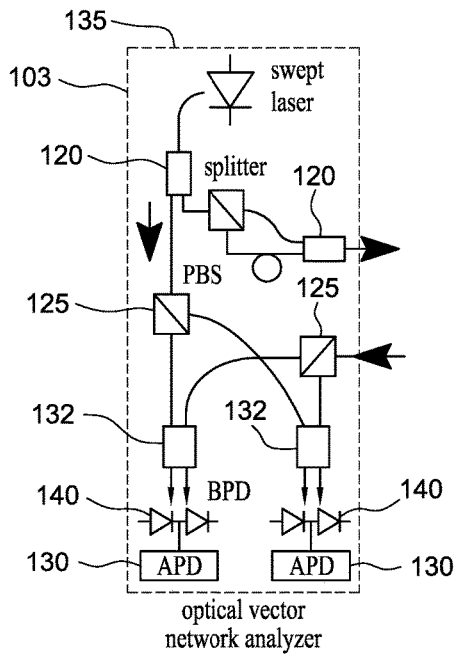
FIG. 2 illustrates an OVNA for performing a mode transform measurement.

FIG. 2 illustrates an OVNA for performing a mode transform measurement. The OVNA 105 using a swept-laser interferometer generates an optical signal by an optical frequency swept laser 135. The optical signal is split and sent to two different polarized beam splitters 125. In one case the transmitted signal is sent to the receive portion of the OVNA 105 where it will be used as a local oscillator signal for coherent detection of the optical signal received back from optical fiber 110. In the other case, the transmitted signal is split into two polarized portions, and one portion is delayed (so that the OVNA can differentiate different transmitted modes, which is a general way for these measurements to be made using a swept-laser interferometer) and then the signals are combined by a 1×2 splitter 120, which is operated in reverse as a combiner, and sent to the optical fiber 110 under test. The reflected signal is then sent back through the test optical fiber 110 and then is routed back to the OVNA 105. This received signal is then split into two polarization components and send to 2×2 90-degree optical hybrids 132, where the received signals are mixed with the local optical oscillator signal. At the two outputs of the optical hybrids 132, the intensities of the mixture of the received and local oscillator optical signals are measured using balanced photodetectors 140. Heterodyning detection is achieved here. The output of the balanced photodetector 140 then is input to analog-to-digital converters 130 and the signals are then processed as described above to determine the mode transfer matrix H.

Figure 3:
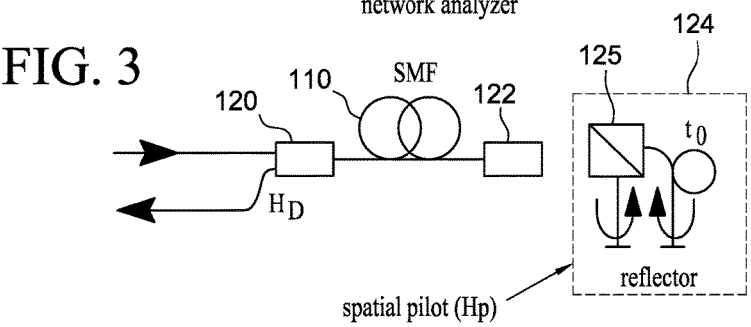
FIG. 3 illustrates the implementation of a time-delay spatial pilot using a single mode fiber.

FIG. 3 illustrates the implementation of a time-delay spatial pilot using a single mode fiber. The test optical signal is received from the OVNA 105 and fed to a splitter/combiner 120 and then coupled to the SMF 110. The couple 122 couples the test optical signal from the SMF 110 to the reflector 124 that implements the spatial pilot. The reflector includes a polarization beam splitter 125 that splits the test optical signal into two polarizations. One of the polarization signals is delayed by $t_0$ and then both signals are reflected and recombined by the polarization beam splitter 125. The combined signal is coupled back onto the SMF 110 and the splitter 120 couples the signal from the SMF 110 back to the receive portion of the OVNA 105 to calculate the mode transform matrix.

Figure 4:
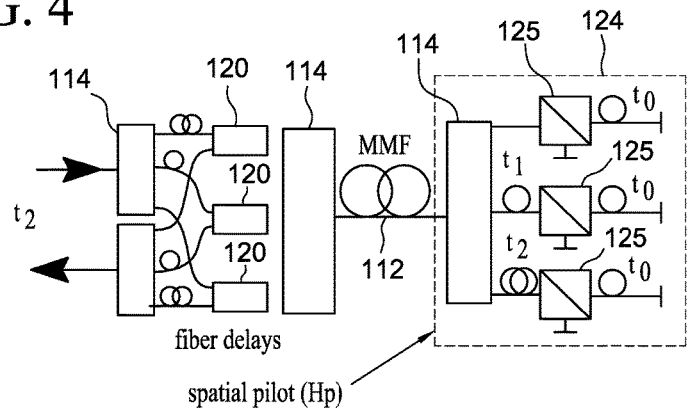
FIG. 4 illustrates the implementation of a time-delay spatial pilot using a multi-mode fiber.

FIG. 4 illustrates the implementation of a time-delay spatial pilot using a multi-mode fiber. The test optical signal is received from the OVNA 105 and fed to a space division multiplexer multiplexer (SMUX) 114. In this example there will be three spatial modes. Each of the three modes are then delayed by different amounts and fed into couples 120 that are then coupled to another SMUX 120. The SMUX couples the three received signals into three different modes on the multimode fiber (MMF) 112. At the other end of the MMF 120 a SMF 114 in the reflector 124 implementing the spatial pilot receives the test optical signal and splits it into it three different modes. Each of the modes is then fed to PBS 125. Two of the modes are delayed by $t_1$ and $t_2$. Each of the delayed mode signals is then fed to a PBS 125 and split into two polarization signals. One of the polarization signals is delayed by $t_0$. Each of the polarization signals are reflected back to the PBS 125 and then combined and coupled back to the SMUX 125. The SMUX 125 then couples the reflected optical signal back to the MMF 112. The SMF 114 at the first end of the MMF 112 receives the reflected optical signal and splits it into it three different modes. The splitter combiners 120 then couple the signals with an additional delay to the SMUX which then couples the combined signal to the receive portion of the OVNA 105 to calculate the mode transform matrix. Note that the spatial pilot cause two of the modes to have delays of $t_1$ and $t_2$. This separates the different spatial modes into different time windows. Then one polarization in each mode is further delayed by $t_0$, which effectively puts each polarization mode in a different time widow from one another. This results in six time delayed modes.

Figure 5:
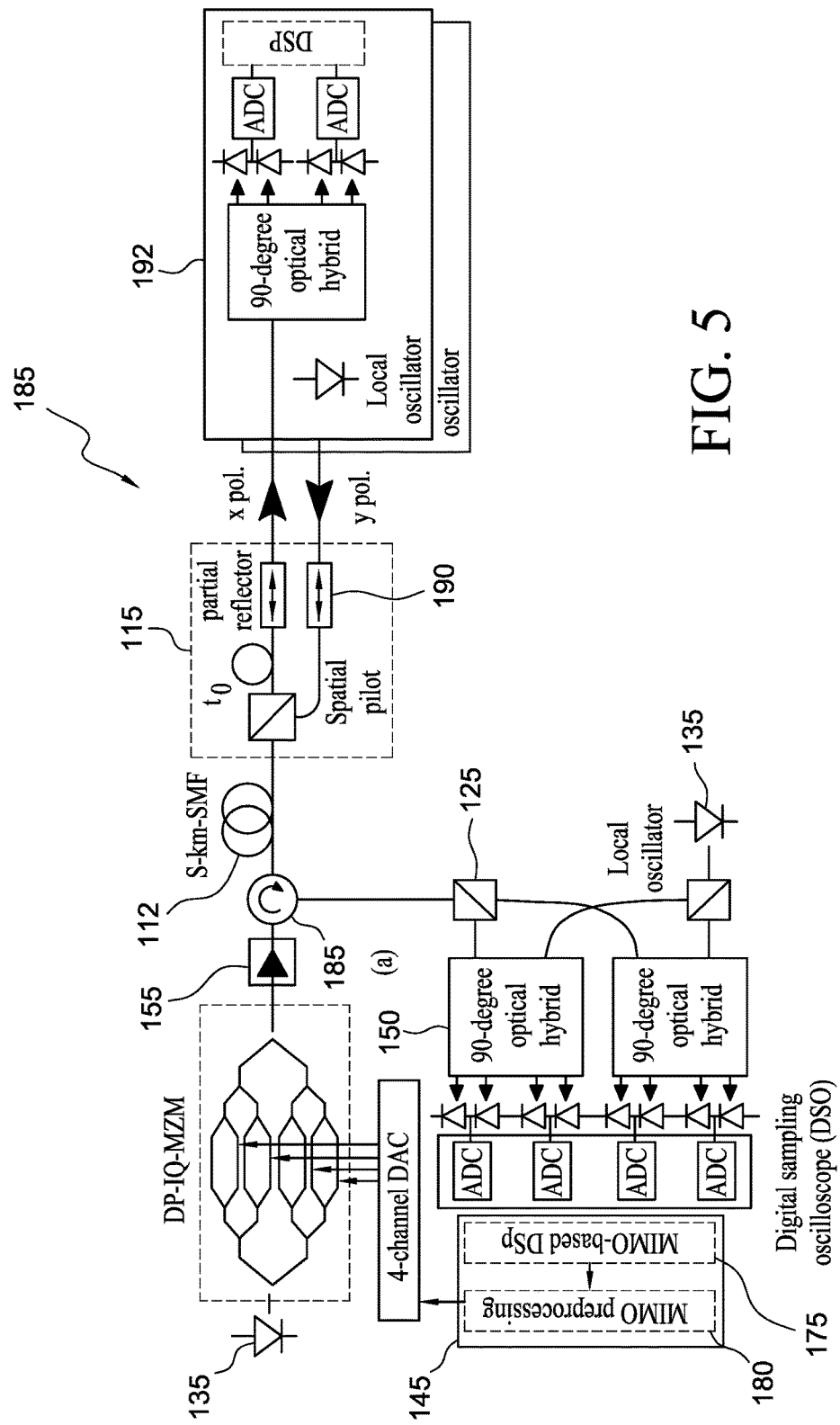
FIG. 5 illustrates a communication system using spatial pilots and end partial reflections to measure the mode transform matrix H of a transmission optical fiber, in a single-ended manner.

FIG. 5 illustrates a communication system using spatial pilots and end partial reflections to measure the mode transform matrix H of a transmission optical fiber 110, in a single-ended manner. The measured mode transform matrix H is then used to pre-code the signals transmitted along the transmission optical fiber 110 so that the received signal will have optical cross polarization and/or spatial propagation mode coupling partially compensated, e.g., the compensation may be used to cause the optical signal received at the second end of the optical fiber 110 be primarily or completely on a single polarization and/or spatial propagation mode for the optical fibers which can support more spatial modes. This example system may use a SMF that has two polarization modes. In some embodiments, the optical fiber 110 can be a MMF having multiple spatial propagation modes.

A digital signal processor (DSP) 145 four different digital signals, where two of the signals represent the two signals from ADCs connected to one 90-degree optical hybrid 150 represent measurements of two phase components, e.g., in-phase and quadrature phase components, of one polarization component of the optical signal, and the two signals from the ADCs connected to the other 90-degree optical hybrid 150 represent measurements of such phase components of the relatively orthogonal component of the optical signal. The optical hybrids 150 also receive polarized light from a local optical oscillator 135 to provide optical mixing that enables such phase sensitive measurements on the received signal light.

A MIMO-based DSP 175 does normal processing on the received signals to enable determination of various components of the transfer matrix of the optical fiber 110 based on measurements of received light in response to various types of spatial pilots being sent to the optical fiber 110. Based on a determination of the transfer matrix H, a transmitter-side pre-compensation encoding 180 may be applied to the signal to be transmitted by the optical transmitter 155 to the optical fiber 110 to pre-compensate partially or completely for the mode and/or polarization coupling that will subsequently occur in the transmission optical fiber 110. For example, the data signals can be 1) amplitude modulated signals such as On-off keying (OOK) or pulse amplitude modulation (PAM) or 2) phase and amplitude modulated signals such as Quadrature Phase Shift Keying (QPSK) or quadrature amplitude modulation (QAM), which is dependent on the application scenarios and capacity requirements. Here QPSK is used as an example. The pre-compensated digital data signals are sent to a 4-channel DAC 165, and the output analog signals are modulated onto a light carrier produced by a light source 135, e.g., using a Mach-Zender (MZ) modulator 155 to implement such pre-compensation. The data-modulated light signal is amplified by an optical amplifier 155 and then launched into the transmission optical fiber 100 via circulator 185.

A specialized reflector 115 may be used to reflect the spatial pilot that is used to measure the mode transform matrix H. A PBS splits the signal from the MMF 112 into two different polarization signals. One of the polarization signals is delayed. Then the signals are coupled to two partial reflectors 190. These partial reflectors reflect a portions of the signal back to the MMF 112 so that the mode transform matrix may be measured when in a mode transform matrix measurement mode. Otherwise, the partial reflectors 190 pass most of the signal on to receivers 192 that process the signal during normal operation. The partial reflectors 192 may use different solutions such as optical fiber gratings, fiber butt coupling with a small gap or special fiber coatings can be applied to make the partial reflectors with required transmission and reflection ratios. It is better to reflect less light backward for calibration in order to provide enough power in the forward propagation signals.

Employing spatial pilots enables optical transmitters to track the transfer matrix of a transmission optical fiber. By applying the inverse of the transfer matrix to the transmitted data streams as MIMO preprocessing at the transmitter side, SDM transmission may be improved by compensating for mode coupling in the optical fiber, which may be applied for short-reach links or passive optical networks to enhance the capacity without increasing the complexity of receivers at the user side.

Figure 6A:
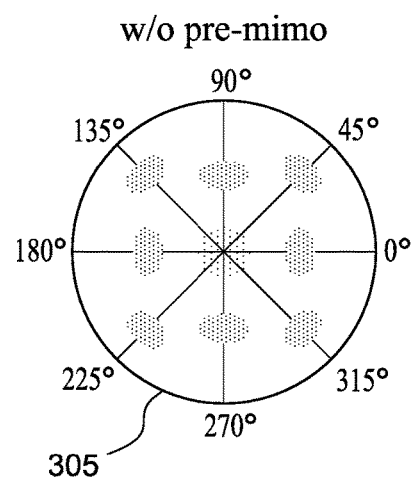
FIG. 6A illustrates a QPSK signal for x polarization without MIMO preprocessing.
Figure 6B:
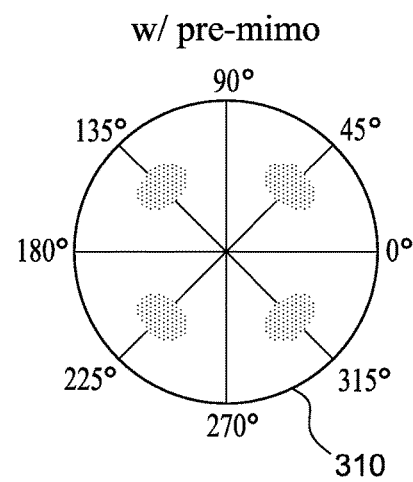
FIG. 6B illustrates a QPSK signal for x polarization with MIMO preprocessing.

The communication system of FIG. 5 was used to test the use of transmitter-side MIMO coding based upon a measured mode transform matrix. A laser 135 operating at 1550 nm was modulated by 30-Gbit/s quadrature phase-shift keyed (QPSK) signals through a dual-polarization in-phase and quadrature Mach-Zehnder modulator (DP-IQ MZM) 155 to generate polarization-diversity signals. The DP-IQ MZM 155 was driven by a 4-channel DAC 165 with two pseudo-random digital data test sequences of length 65536. The modulated light was amplified 155 and launched into a 5-km SMF 110. Spatial pilots were added to two separate polarizations as shown in FIG. 2. Partial reflectors 190 replaced optical fiber loop mirrors to provide 70% transmission. Reflected signals were sent to the polarization-diversity coherent receiver through a circulator 185 as port A of the optical switch 160 was linked and captured by a 4-channel 50-GSamples/s digital sampling oscilloscope (DSO) Channel estimation by multiplying the received signals with the pseudo inverse of the time aligned sent patterns was used to estimate the mode transform matrix H. Employing MIMO preprocessing with the inversed transfer matrix, more than 18-dB polarization extinction ratio was achieved, which is mainly limited by the performance of the PBS. To characterize the performance of MIMO preprocessing for MIMO-free signal recovery, signals were applied to both polarizations at the transmitter and two individual single-polarization coherent receivers are used to capture the data signals from x and y polarization without using MIMO-based polarization-multiplexed coherent receivers, which may be useful for passive optical networks where receivers or end users will be far from each other and MIMO processing in the receiver will be impossible. Without MIMO preprocessing, QPSK signal for x polarization cannot be correctly recovered using only frequency and phase recovery as shown in FIG. 6A. Employing transmitter-side MIMO preprocessing, clear QPSK constellations can be observed as shown in FIG. 6B, which verifies that each output polarization after the spatial pilot section can be individually recovered without using MIMO-based digital signal processing (DSP), and polarization-diversity 2×30-Gbit/s QPSK transmission over 5-km SMF without mode coupling induced errors may be achieved. The methods described herein can be used for optical fibers of much longer length as well.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any block diagrams herein represent conceptual views of illustrative circuitry embodying the principles of the invention.

Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method comprising:
   coupling one or more optical spatial pilot signals into a first end of an optical fiber, wherein the optical fiber is a multimode optical fiber;
   receiving a reflected portion of the one or more optical spatial pilot signals at the first end of the optical fiber in response to the reflected portion having propagated through the optical fiber in both directions; and
   processing the reflected portion of the one or more optical spatial pilot signals to determine components of at least one of a round-trip transfer matrix of the optical fiber and a single-direction transfer matrix of the optical fiber.

2. The method of claim 1, wherein the processing further includes determining the single-direction transfer matrix of said optical fiber by determining components of the round-trip transfer matrix of said optical fiber.

3. The method of claim 1, wherein the one or more optical spatial pilot signals includes time delayed light signals for each mode of the optical fiber.

4. The method of claim 3, wherein the processing the reflected portion of the one or more optical spatial pilot signals includes processing the reflected portion of the one or more optical spatial pilot signals in different time windows based upon time delays applied for each mode in the one or more optical spatial pilot signals.

5. The method of claim 2, wherein the one or more optical spatial pilot signals includes light signals having different frequencies for one or more propagation modes of the optical fiber.

6. The method of claim 2, wherein the processing the reflected portion of the one or more optical spatial pilot signals includes processing the reflected portion of the one or more optical spatial pilot signals in different frequency windows based upon frequencies of the one or more optical spatial pilot signals.

7. The method of claim 1, further comprising:
   pre-compensating data signal streams to modulate optical carriers and transmitting said modulated optical carriers to the optical fiber, the pre-compensating being based upon the determined components of the at least one of the transfer matrices.

8. An apparatus comprising:
   an optical transmitter configured to generate components of an optical spatial pilot;
   a multimode optical coupler configured to couple the components of the optical spatial pilot onto different propagation modes of an optical fiber at a first end thereof; and
   an optical analyzer configured to process light emitted at the first end in response to the components of the optical spatial pilot being coupled to the optical fiber at the first end to determine components of a round-trip and/or a single-direction mode transfer matrix of the optical fiber.

9. The apparatus of claim 8, further comprising:
   a reflector at a second end of the optical fiber configured to reflect back light of the optical spatial pilot.

10. The apparatus of claim 8, wherein the optical fiber is a multi-mode optical fiber.

11. The apparatus of claim 8, wherein the optical spatial pilot includes a sequence of time delayed light signals.

12. The apparatus of claim 9, wherein the optical analyzer is configured to process the reflected light in different time windows based upon time delays applied to the components of the optical spatial pilot, at coupling to the optical fiber.

13. The apparatus of claim 8, wherein the optical spatial pilot includes light signals having different wavelengths that are coupled onto different ones of the propagation modes of the optical fiber.

14. The apparatus of claim 12, wherein the optical analyzer is configured to process the reflected light of the optical spatial pilot in different wavelength bands.

15. The apparatus of claim 12, further comprising:
   a multiple input multiple output preprocessor configured to preprocess a set of digital signal streams based upon the determined components of the round-trip or single-direction transfer matrix and to modulate the preprocessed data streams onto a set of optical carriers in parallel for transmission to the optical fiber.

* * * * *